UNITED STATES PATENT OFFICE.

WILHELM BAUER, OF VOHWINKEL, NEAR ELBERFELD, AND ALFRED HERRE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

BLUE VAT DYE.

980,140. Specification of Letters Patent. Patented Dec. 27, 1910.

No Drawing. Original application filed September 8, 1909, Serial No. 516,686. Divided and this application filed September 29, 1910. Serial No. 584,526.

*To all whom it may concern:*

Be it known that we, WILHELM BAUER and ALFRED HERRE, doctors of philosophy, chemists, citizens of the German Empire, residing, respectively, at Vohwinkel, near Elberfeld, and Elberfeld, Germany, have invented new and useful Improvements in Blue Vat Dye, of which the following is a specification.

Our present application which is a divisional application from our Patent 961396, patented June 14, 1910, relates to the production of a specific vat dyestuff. It is obtained by condensing dichloroisatin chlorid with 1-anthrol.

The new dye is in a dry state a dark blue crystalline powder with a metallic luster which is soluble in hot benzene with a blue coloration and is soluble in concentrated sulfuric acid with an olive coloration, and which yields with hydrosulfite and caustic soda lye an orange vat, dyeing cotton after exposure to air blue shades remarkable for their fastness to chlorin.

In order to illustrate the process more fully the following example is given, the parts being by weight:—210 parts of dichloroisatin are converted in a dry chlorobenzene suspension into dichloroisatin chlorid by heating it with 210 parts of $PCl_5$. The mixture thus obtained is then poured into a hot solution which is well stirred of 220 parts of 1-anthrol in dry chlorobenzene. Stirring is continued for 2 hours and the dye which separates on cooling is filtered off and washed.

We claim:—

The herein described dyestuff obtainable from dichloroisatin-alpha-chlorid and 1-anthrol, which dyestuff is in a dry state a blue crystalline powder, soluble in hot benzene with a pure blue and in concentrated sulfuric acid with an olive coloration, and which yields with hydrosulfite and caustic soda lye an orange vat from which cotton is dyed a pure blue, substantially as described.

In testimony whereof we have hereunto set our hands in the presence of two subscribing witnesses.

WILHELM BAUER. [L. S.]
ALFRED HERRE. [L. S.]

Witnesses:
WALTER VONNEGUT,
ALFRED HENKEL.